(12) United States Patent
Shu et al.

(10) Patent No.: US 11,867,615 B2
(45) Date of Patent: Jan. 9, 2024

(54) FIELD CALIBRATION FOR NEAR REAL-TIME FABRY PEROT SPECTRAL MEASUREMENTS

(71) Applicant: TruTag Technologies, Inc., Kapolei, HI (US)

(72) Inventors: Guocai Shu, Pleasanton, CA (US); Alexandre Fong, Orlando, FL (US)

(73) Assignee: TruTag Technologies, Inc., Kapolei, HI (US)

( * ) Notice: Subject to any disclaimer, the term of this patent is extended or adjusted under 35 U.S.C. 154(b) by 20 days.

(21) Appl. No.: 17/705,095

(22) Filed: Mar. 25, 2022

(65) Prior Publication Data

US 2023/0304925 A1    Sep. 28, 2023

(51) Int. Cl.
*G01N 21/35* (2014.01)
*G01J 3/28* (2006.01)

(52) U.S. Cl.
CPC ............... *G01N 21/35* (2013.01); *G01J 3/28* (2013.01); *G01J 3/2823* (2013.01); *G01J 2003/2826* (2013.01); *G01J 2003/2873* (2013.01); *G01J 2003/2879* (2013.01); *G01N 2201/127* (2013.01)

(58) Field of Classification Search
CPC .......... G01N 21/35; G01J 3/28; G01J 3/2823; G01J 2003/2826; G01J 2003/2873; G01J 2003/2879
See application file for complete search history.

(56) References Cited

U.S. PATENT DOCUMENTS

| | | | |
|---|---|---|---|
| 10,578,487 B2 * | 3/2020 | Learmonth | G01J 3/0297 |
| 2002/0011567 A1 * | 1/2002 | Ozanich | G01J 3/0224 |
| | | | 250/326 |
| 2007/0159638 A1 | 7/2007 | Zeng | |
| 2014/0176729 A1 * | 6/2014 | Saari | G01J 3/0208 |
| | | | 348/182 |
| 2015/0377706 A1 * | 12/2015 | Sano | G01J 3/0208 |
| | | | 356/456 |
| 2018/0080825 A1 * | 3/2018 | Learmonth | G01J 3/0297 |
| 2018/0128682 A1 * | 5/2018 | Nissim | G01J 3/45 |
| 2020/0088579 A1 * | 3/2020 | Balas | G01J 3/2823 |
| 2021/0350174 A1 * | 11/2021 | Merkle | H04N 1/56 |

* cited by examiner

*Primary Examiner* — David P Porta
*Assistant Examiner* — Casey Bryant
(74) *Attorney, Agent, or Firm* — Van Pelt, Yi & James LLP (57) ABSTRACT

A system includes a tunable Fabry-Perot etalon, a detector, and a processor. The tunable Fabry-Perot etalon has a settable gap. The detector measures light intensity transmitted through the tunable Fabry-Perot etalon. The processor is configured to determine the calibrated spectral measurement, wherein the calibrated spectral measurement is based at least in part on a measurement set of detected light intensities for a selected set of settable gaps and a reconstruction matrix. The reconstruction matrix is based at least in part on calibration measurements using one or more field material targets, prior stored full calibrations for each of the one or more field material targets, and the selected set of settable gaps.

18 Claims, 11 Drawing Sheets

FPI Peaks :418.9 nm, 481.4 nm, 571.0 nm, 706.7 nm, 936.7 nm at gap index 114

RGB sensor response for peaks :418.9 nm, 481.4 nm, 571.0 nm, 706.7 nm, 936.7 nm

FIG. 7B $$\begin{bmatrix} X_{00} & X_{01} & X_{02} \\ X_{10} & X_{11} & X_{12} \\ X_{20} & X_{21} & X_{22} \\ X_{30} & X_{31} & X_{32} \\ X_{40} & X_{41} & X_{42} \end{bmatrix} = \begin{bmatrix} p_{00}, p_{01}, p_{02}, p_{03}, \ldots, p_{0n} & \text{band 0} \\ p_{10}, p_{11}, p_{12}, p_{13}, \ldots, p_{1n} & \text{band 1} \\ p_{20}, p_{21}, p_{22}, p_{23}, \ldots, p_{2n} & \text{band 2} \\ p_{30}, p_{31}, p_{32}, p_{33}, \ldots, p_{3n} & \text{band 3} \\ p_{40}, p_{41}, p_{42}, p_{43}, \ldots, p_{4n} & \text{band 4} \end{bmatrix} \begin{bmatrix} P_{0r} & P_{1r} & P_{2r} \ldots P_{nr} \\ P_{0g} & P_{1g} & P_{2g} \ldots P_{ng} \\ P_{0b} & P_{1b} & P_{2b} \ldots P_{nb} \end{bmatrix}^{-1}$$

FIELD CALIBRATION FOR NEAR REAL-TIME FABRY PEROT SPECTRAL MEASUREMENTS

BACKGROUND OF THE INVENTION

Hyperspectral images include spectral information for every pixel in a field of view captured. The development and proliferation of multispectral and hyperspectral imaging technologies have introduced new possibilities in optical based detection and identification of materials and structures. As an optical technology, subject distances range from remote to microscopic and are as such potentially valuable tools for several important applications.

However, most conventional technologies such as push-broom grating, liquid crystal tunable (LCTFs) and acousto-optic tunable filters (AOTFs) have been limited in their ability to capture the data in a timely manner with the required spectral resolution and spatial uniformity, resolution, and range. LCTFs and AOTFs are also polarization dependent which limit their potential range of applications.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for field calibration for near real-time Fabry-Perot spectral measurements is disclosed. The system comprises a tunable Fabry-Perot etalon, a detector, and a processor. The tunable Fabry-Perot etalon has a settable gap. The detector measures light intensity transmitted through the tunable Fabry-Perot etalon. The processor is configured to determine the calibrated spectral measurement. The calibrated spectral measurement is based at least in part on a measurement set of detected light intensities for a selected set of settable gaps and a reconstruction matrix. The reconstruction matrix is based at least in part on calibration measurements using one or more field material targets illuminated with a limited set of source wavelengths, prior stored full calibrations for each of the one or more field material targets, and the selected set of settable gaps.

A method for dynamic selection of the number, settings, and calibration of band-passes in an FPI based hyperspectral imager system is disclosed. The system comprises a Fabry-Perot etalon, a broadband illumination system, an imaging area sensor, focusing optics, sample fixturing, and a data acquisition and processing computer platform. In some embodiments, the system is used to rapidly identify substances. In some embodiments, the system is used to identify and target threats in a battlefield environment or for surveillance of threats in similar civilian contexts.

The disclosed method provides for an FPI hyperspectral imager system to be utilized with an improved degree of speed and flexibility over prior calibration and measurement methods.

A data cube, also known as a hypercube, is a three-dimensional representation of the captured data whereby the two dimensions of the image's spatial components (x, y coordinates) are augmented by the wavelength in the third. The number of band-passes required in each data cube varies depending upon the resolution of the spectral signature required to differentiate between threats, a substance of interest, a feature of interest, and normal objects. For closely similar targets, this can be typically in the hundreds. Such data cubes can be very large files, typically 1 GB each.

The light from the illuminated sample area projects an image via the focusing optics through the Fabry-Perot etalon onto the imaging area sensor.

The area sensor renders a digital image which is captured by the processing computer. In various embodiments, the area sensor comprises a complementary metal-oxide-semiconductor (CMOS) sensor, a charge-coupled device (CCD) sensor, another solid-state imaging area sensor, or any other type of appropriate area sensor. In various embodiments, the area sensor comprises one or more of: a monochrome detector, an RGB detector, an RGB and IR detector, a multiple band detector, or any other appropriate sensor.

In some embodiments, an RGB or Bayer pattern color sensor is used to collect multiple band-passes transmitted to generate a hyperspectral data cube, whereby each exposed frame in the series represents the image at a single bandpass. In some embodiments, a monochrome sensor is utilized.

In the disclosed system, the mirror separation of the Fabry-Perot etalon is adjusted to collect single exposures of the illuminated sample area at multiple band-passes. Each exposure contains an interferogram to which a mathematical transform is applied—for example, a mathematical transform applied via a reconstruction matrix. The transform converts the interferogram into wavelength intensities for the individual band-passes and a mathematical calibration is applied to match the interferogram exposures to the correct wavelength indices.

In some embodiments, the transform is derived using a calibration based on calibration measurements. In some embodiments, a calibration measurement of the calibration measurements comprises selecting a field material target. In some embodiments, a calibration measurement of the calibration measurements comprises selecting a subset of narrowband illuminations. In some embodiments, a calibration measurement of the calibration measurements comprises selecting a subset of mirror gaps.

In some embodiments, the calibrated spectral measurement of an object comprises selecting specific illumination. In some embodiments, the calibrated spectral measurement comprises selecting a subset of settable gaps. In some embodiments, the calibrated spectral measurement comprises capturing an image using the detector.

In some embodiments, the reconstruction matrix is determined using calibration measurements of a specific field material target made with the limited set of source wavelengths to scale a prior stored full calibration for the specific field material target. In some embodiments, the reconstruction matrix is determined using a composite of reconstructed matrices determined using each of the one or more field material targets.

In some embodiments, during a calibration measurement the Fabry-Perot etalon is set to a number of gaps, wherein the selected set of settable gaps includes settable gaps that number less than a predetermined number of settable gaps. In some embodiments, during a calibration measurement a limited set of source wavelengths are used including wavelengths that number less than a predetermined number of source wavelengths. In some embodiments, the calibration measurement uses one or more field material targets that comprise field material targets that number less than a predetermined number of field material targets.

Figure 1:
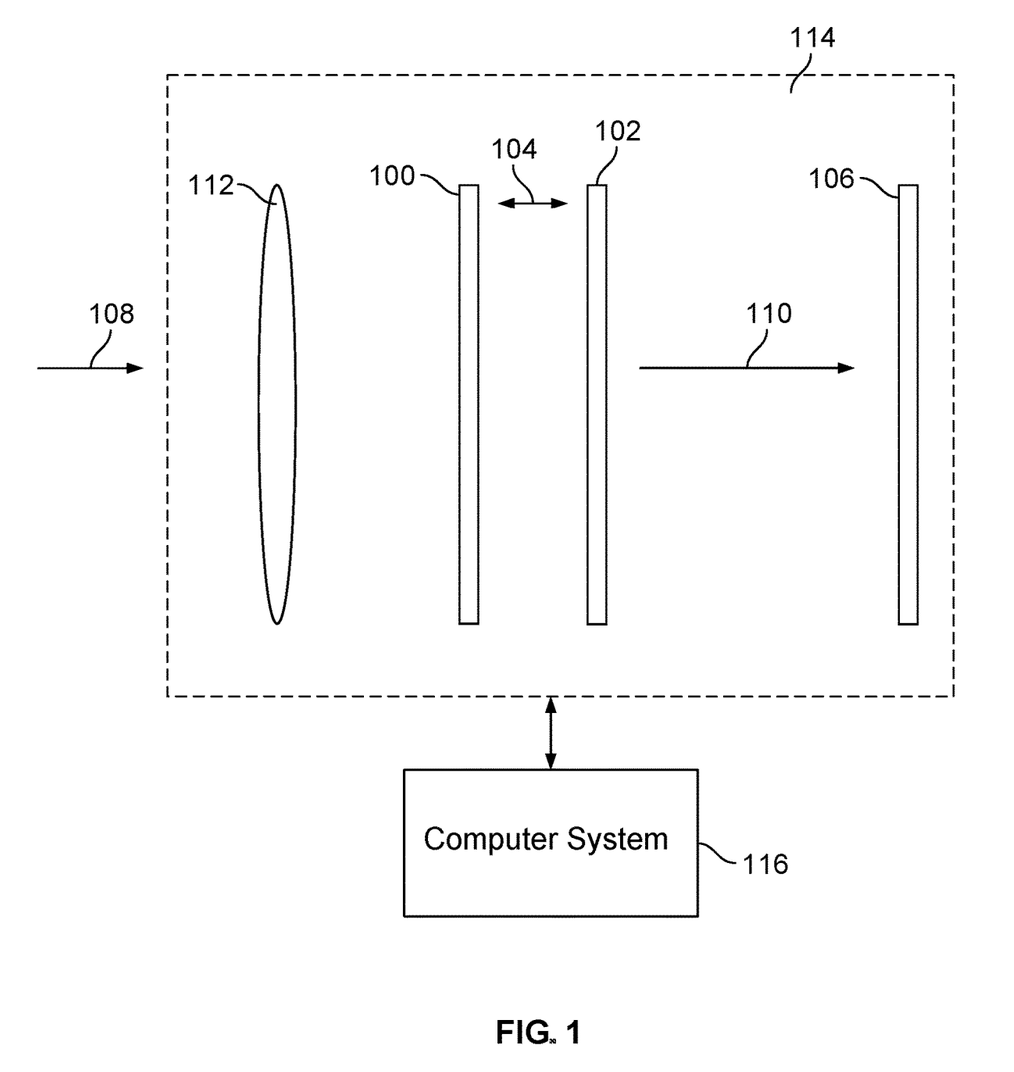
FIG. 1 is a diagram illustrating an embodiment of a Fabry-Perot variable etalon interferometer (FPI).

FIG. 1 is a diagram illustrating an embodiment of a Fabry-Perot variable etalon interferometer (FPI). FPI 114 based hyperspectral imager confers significant advantages by enabling the capture of high spectral resolution, high spatial resolution, and wide spectral range without polarization dependence.

In the example shown, a Fabry-Perot etalon is typically comprised of two semi-reflective mirrors (mirror 100 and mirror 102) arranged parallel to one another. Light 108 from a source enters through one side of the mirror pair (e.g., mirror 100). In some embodiments, light 108 is shaped using optics 112. At various periodic spacings or gaps (gap spacing 104), the constructive and destructive interference result in specific wavelength band-passes, single or multiple, to exit (e.g., light 110) through the other mirror (e.g., mirror 102). By varying gap spacing 104 over a range of spacings and capturing the output with image sensor 106 at different exposures, a data or hyper cube containing the spectra for each pixel in the image can be collected. Computer system 116 receives data from image sensor 106 to process for determining a calibration or calibrated measurement. In some embodiments, computer system 116 is used for controlling an illumination source for a target (e.g., a narrowband illumination source, a broadband illumination source, a monochromator, etc.)—for example, turning the source on and/or off, selecting a wavelength or set of wavelengths, selecting an intensity or set of intensities, etc. In some embodiments, computer system 116 is able to set a gap spacing or a set of gap spacings. In some embodiments, computer system 116 provides an interface to a user for control of the illumination or set of illuminations, of the gap spacing or a set of gap spacings, of the image collection or set of image collections, etc.

The transmission or throughput of the etalon system (e.g., light 110 at the output compared to light 108 at the input) is a function of the reflectance coatings utilized and the order of the interference band passes transmitted. The etalon's resolution is also directly proportional to the reflectance, and as such, a compromise between resolution and transmission must be made.

Due to practical constraints in achieving certain narrow and wide etalon spacings, while maintaining the required parallelism and obtaining sufficient signal to noise, operating in only single bandpass gap spacings limits the usable spectral range of FPI 114. In order to expand the useable range, schemes are used that exploit the collection of multiple band passes. Using a multiple channel image sensor, such as a color sensor, enables a means to solve for the individual band passes.

Such methods require the capture of all the gap spacings for the full range which can be time consuming in terms of the image capture. To expedite the process, the range of gap spacings can be restricted, and/or the instrument configured to decrease the number of gaps captured while still ensuring enough band-passes are captured over the entire range of interest. This approach requires the compromise of a loss of potentially critical information. The implementation also requires a priori determination of the spacings and thus is not dynamically adjustable.

Figure 2:
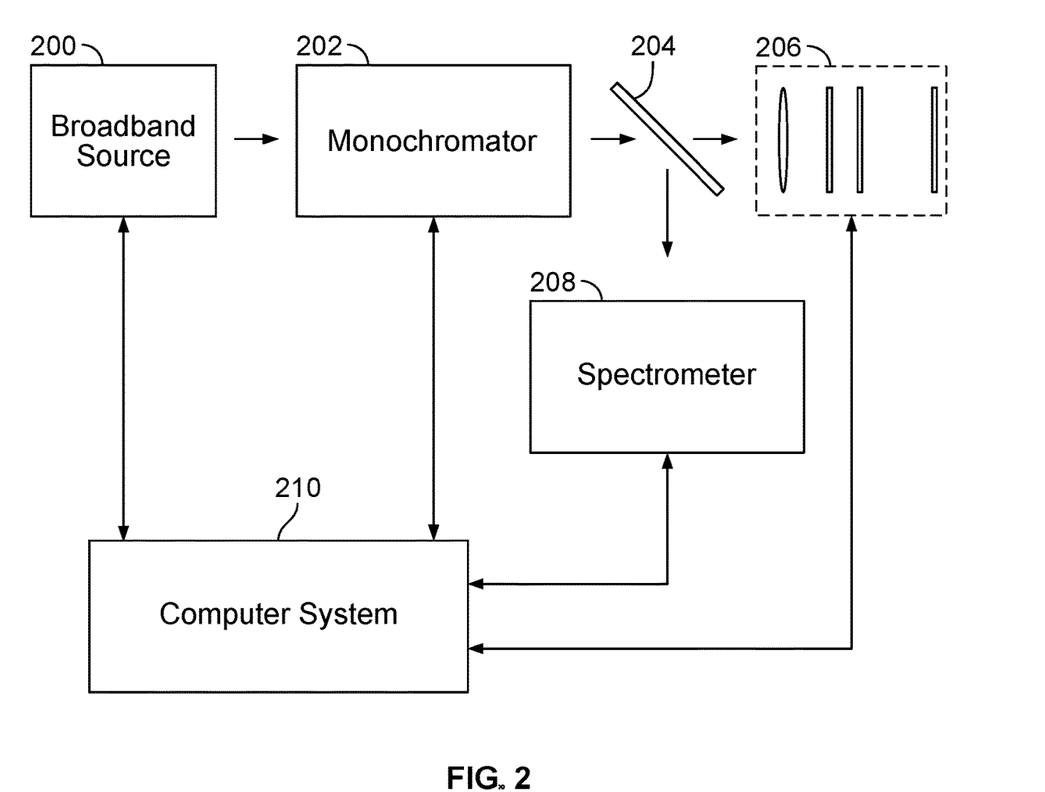
FIG. 2 is a diagram illustrating an embodiment of a system for making a calibration measurement for an FPI.

FIG. 2 is a diagram illustrating an embodiment of a system for making a calibration measurement for an FPI. In some embodiments, FPI 114 of FIG. 1 is used to implement FPI 206 of FIG. 2. In the example shown, broadband source 200 generates light that is passed through monochromator 202 to filter the light to a single wavelength of light. This single wavelength of light is split using beam splitter 204 to be measured by spectrometer 208 for a precise measurement of the wavelength and to illuminate FPI 206. In some embodiments, the measurement of the wavelength by spectrometer 208 is done sequentially without beam splitter 204 by disposing spectrometer 208 in the location of FPI 206 after an FPI 206 measurement. A response of FPI 206 can then be made for multiple gap spacings. A full calibration is time consuming as it requires setting monochromator 202 at a specific wavelength and then for that specific wavelength measuring a full set of gap spacings. This measurement is then repeated for another specific wavelength until a full set of wavelengths has each been measured at a full set of gap spacings.

In some embodiments, computer system 210 is used for controlling and/or coordinating the calibration measurement. For example, computer system 210 is able to indicate turning broadband source 200 on or off, indicate selecting a wavelength via monochromator 202, indicate setting a gap spacing for FPI 206, indicate acquiring an image using an image sensor of FPI 206, indicate measuring a wavelength or spectra using spectrometer 208, receive data from FPI 206 (e.g., image data, gap data, etc.), from spectrometer 208 (e.g., wavelength or spectra data, etc.), from monochromator 202 (e.g., wavelength setting data, etc.), from broadband source 200 (e.g., on/off status, etc.), display an interface, receive commands, or any other appropriate function for computer system 210.

Figure 3:
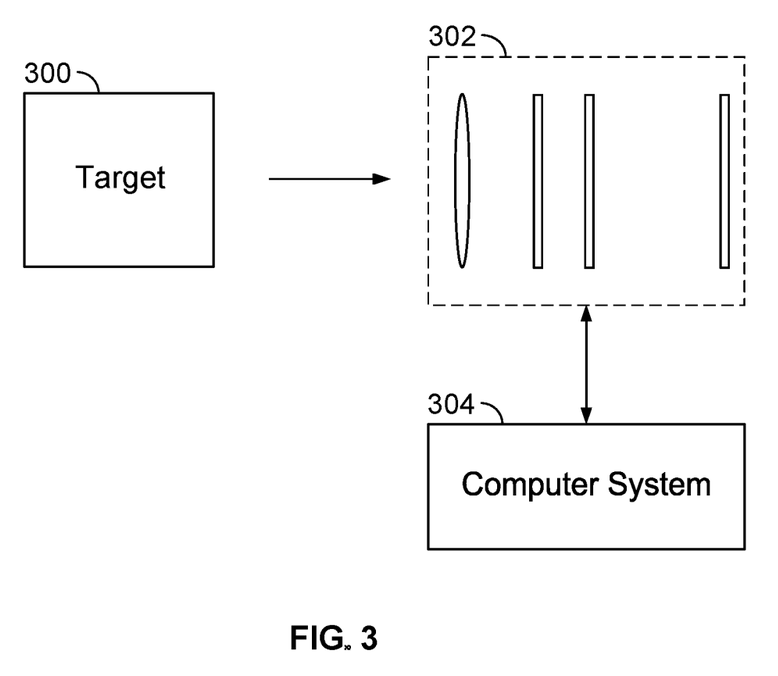
FIG. 3 is a diagram illustrating an embodiment of a system for making a measurement using an FPI.

FIG. 3 is a diagram illustrating an embodiment of a system for making a measurement using an FPI. In some embodiments, FPI 114 of FIG. 1 is used to implement FPI 302 of FIG. 3. In the example shown, light from target 300 is detected by FPI 302. The light is detected using FPI 302 sensor at multiple gap spacings. The intensity profiles generated by detecting the light at multiple gap spacings are useful to determine a rendering or reconstruction of a data cube comprising a stack of exposures each with the intensities for a given band-pass in wavelength space.

In some embodiments, computer system 304 is used for controlling and/or coordinating the measurement. For example, computer system 304 is able to indicate turning a broadband source on or off, indicate selecting an illumination wavelength via a monochromator, indicate setting a gap spacing for FPI 302, indicate acquiring an image using an image sensor of FPI 302, receive data from FPI 302 (e.g., image data, gap data, etc.), from a monochromator (e.g., wavelength setting data, etc.), from a broadband source (e.g., on/off status, etc.), display an interface, receive commands, or any other appropriate function for computer system 304 in making a measurement.

Figure 4:
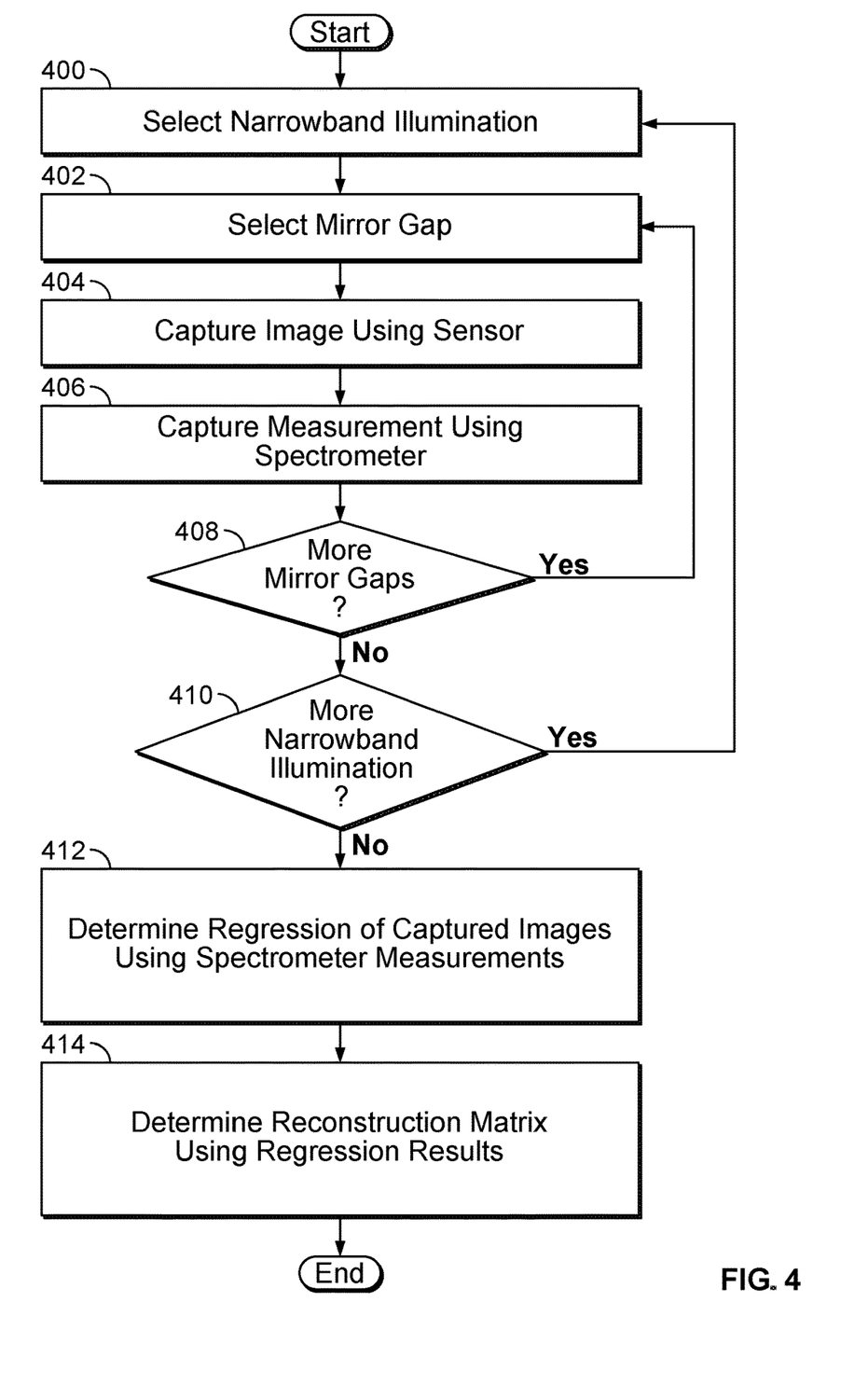
FIG. 4 is a flow diagram illustrating an embodiment of a process for calibration of an FPI.

FIG. 4 is a flow diagram illustrating an embodiment of a process for calibration of an FPI. In some embodiments, the process of FIG. 4 is performed using a computer system (e.g., computer system 116 of FIG. 1). In the example shown, in 400 a narrowband illumination is selected. For example, a narrowband illumination for the FPI is selected by generating the narrowband illumination using a broadband source that is filtered using a monochromator. In 402, a mirror gap is selected. For example, a gap spacing is selected for the mirrors in the FPI. In 404, an image is captured using a sensor. For example, the area sensor of the FPI captures an image at the selected mirror gap for the selected narrowband illumination. In 406, a measurement is captured using a spectrometer. For example, the narrowband illumination is measured using a spectrometer to determine the wavelength of the narrowband illumination being provided to the FPI. In 408, it is determined whether there are more mirror gaps. For example, it is determined whether there are more gaps needed to be acquired for the calibration data set. In response to determining that there are more mirror gaps, control passes to 402. In response to determining that there are no more mirror gaps, control passes to 410. In 410, it is determined whether there are more narrowband illuminations. For example, it is determined whether there are more narrowband illuminations needed to be acquired for the calibration data set. In response to determining that there are more narrowband illuminations, control passes to 400. In response to determining that there are no more narrowband illuminations, control passes to 412. In 412, a regression of captured images is determined using the spectrometer measurements. For example, the images captured at spacing gaps are analyzed using the known wavelengths of light that were used in capturing the images at the spacing gaps, where the known wavelengths are determined by the spectrometer measurements. In 414, a reconstruction matrix is determined using the regression results. For example, the reconstruction matrix can be used to determine a spectral measurement of the target from the set of FPI measurements at different gap spacings.

Figure 5:
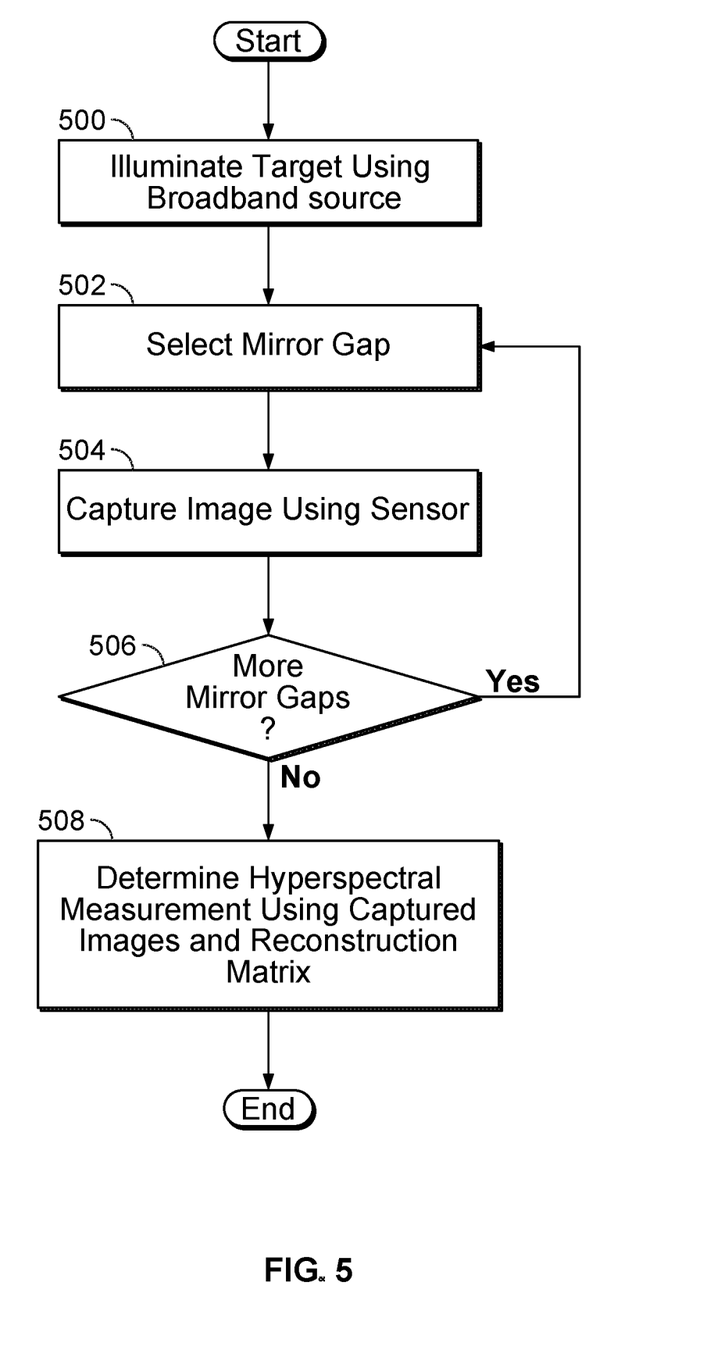
FIG. 5 is a flow diagram illustrating an embodiment for making a hyperspectral measurement.

FIG. 5 is a flow diagram illustrating an embodiment for making a hyperspectral measurement. In some embodiments, the process of FIG. 5 is executed using a computer system (e.g., computer system 116 of FIG. 1). In the example shown, in 500, a target is illuminated using a broadband source. In 502, a mirror gap is selected. For example, a mirror gap of an FPI is selected for a measurement. In 504, an image is captured using a sensor. For example, a measurement is made by capturing an image using an area sensor of an FPI. In 506, it is determined whether there are more mirror gaps. In response to determining that there are more mirror gaps, control passes to 502. In response to determining that there are no more mirror gaps, control passes to 508. In 508, a hyperspectral measurement is determined using captured images and reconstruction matrix. For example, the captured images from the FPI are processed using the reconstruction matrix to determine a hyperspectral measurement.

In some embodiments, the process of FIG. 5 is used for capturing a hyperspectral data-cube. In a typical example, (1) the camera is placed in front of the scene or illuminated sample to be captured; (2) the user initiates the image and data capture via a user interface (e.g., as part of a computer program that controls FPI data capture); (3) a mirror separation distance is set in the Fabry-Perot etalon by the computer; (4) a single frame exposure is captured by the sensor; and (5) the frame is saved digitally on a storage medium. A next mirror position is set and the previous steps (3) and (4) are repeated until all mirror gap settings or band-passes are captured such that the full spectral range of interest is captured. A mathematical matrix transform is applied to the data in the frames of images such that a calibration is applied, and a data cube is constructed. In some embodiments, a machine learning algorithm that has been trained on known samples is applied to the data cube to group or classify regions of the image of interest (e.g., to classify pathogens or threats in the environment, etc.)

Figure 6A:
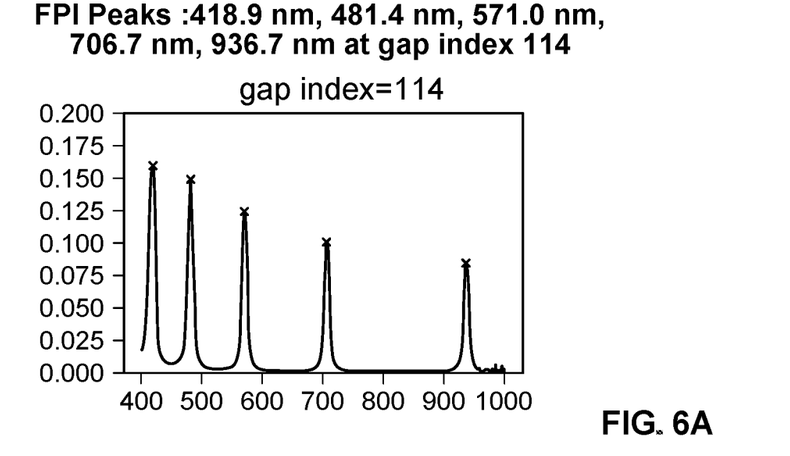
FIGS. 6A, 6B, and 6C are graphs illustrating embodiments of determining a spectral response from FPI measurements.
Figure 6B:
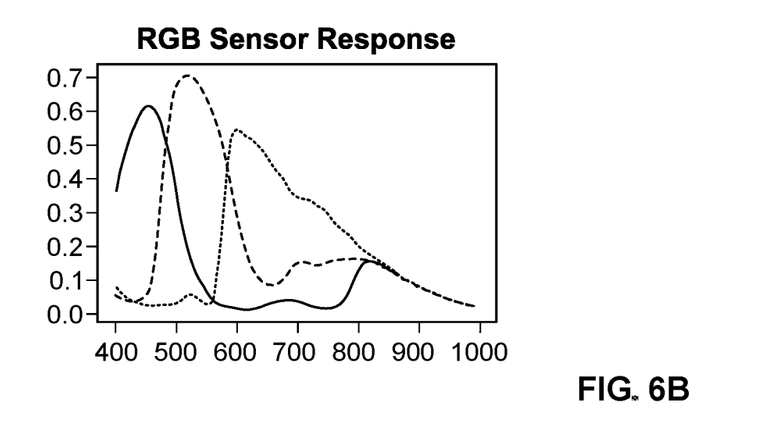
Figure 6C:
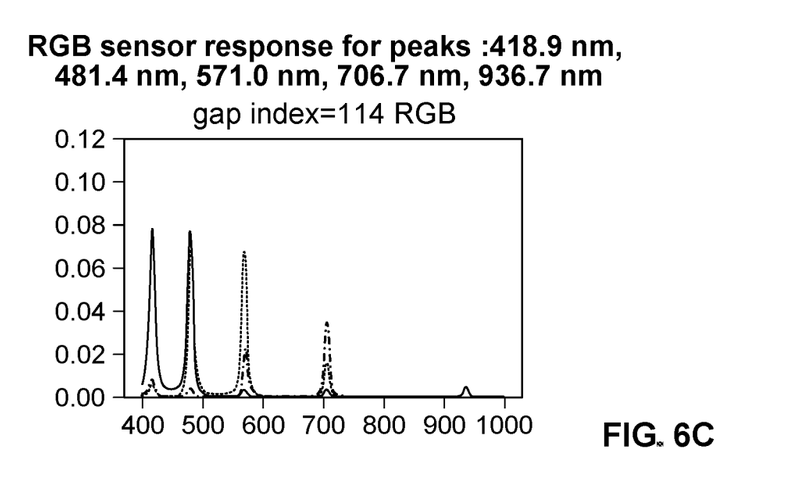

FIGS. 6A, 6B, and 6C are graphs illustrating embodiments of determining a spectral response from FPI measurements. In some embodiments, the graphs of FIGS. 6A, 6B, and/or 6C are generated using a computer system (e.g., computer system 116 of FIG. 1). In the example shown in FIG. 6A, FPI peaks are shown for transmission at gap index 114 using a broadband illumination. In the example, peaks are shown at 418.9 nm, 481.4 nm, 571.0 nm, 706.7 nm, and 936.7 nm. In the example shown in FIG. 6B, an FPI RGB sensor response is shown. In the example, three curve responses are displayed for the three sensors—a low wavelength sensor with peak between 400-500 nm, a middle wavelength sensor with peak between 500-600 nm, and a high wavelength sensor with peak between 600-700 nm. In the example shown in 6C, an FPI RGB sensor response is shown for FPI transmission peaks in FIG. 6A as detected by RGB sensor in FIG. 6B. In the example shown, three curves are shown indicating the responses for each sensor of the RGB sensor for the given FPI peaks of FIG. 6A. In various embodiments, the sensor used for measuring the responses comprises a monochrome sensor, a non-RGB sensor, an IR sensor, or any other sensor or combination thereof.

In some embodiments, the measurements from the RGB sensors are processed using a calibration to calculate the actual spectral response.

Figure 7A:
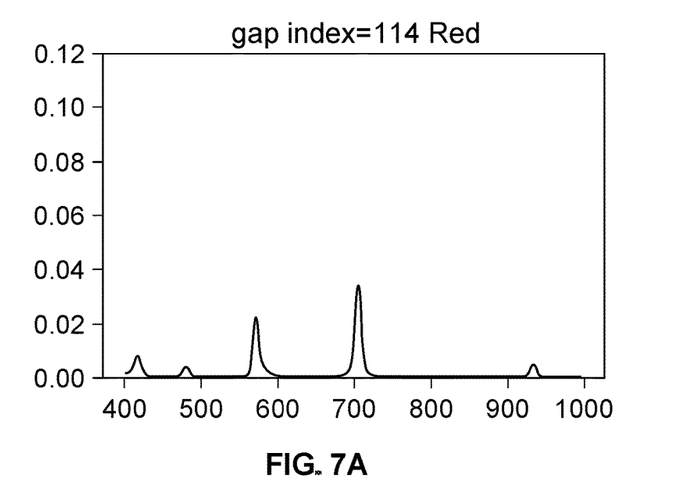
FIGS. 7A, 7B, and 7C are diagrams illustrating an embodiment of processing to determine spectral characteristics of an object.
Figure 7B:
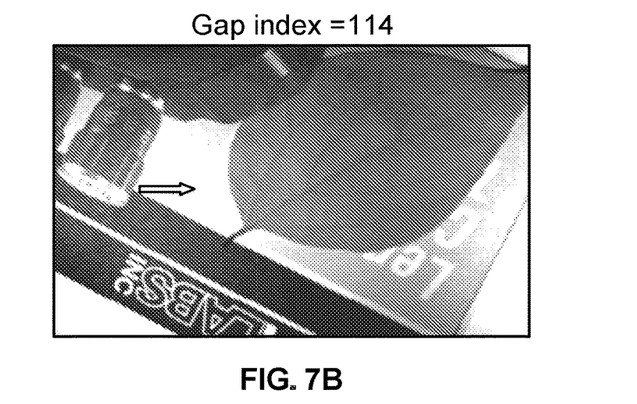
Figure 7C:
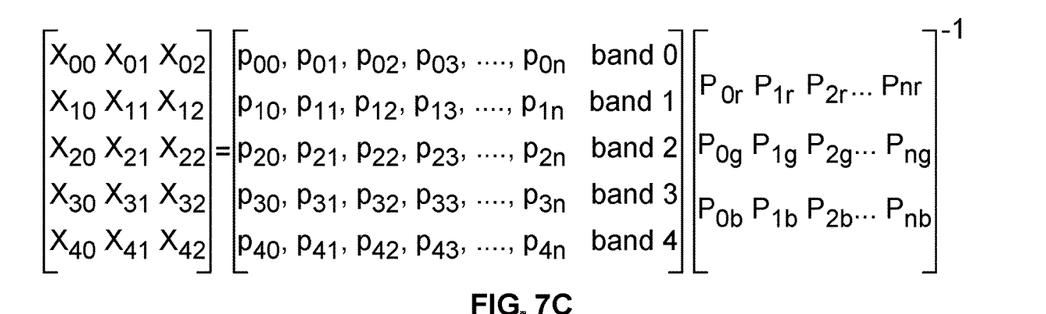

FIGS. 7A, 7B, and 7C are diagrams illustrating an embodiment of processing to determine spectral characteristics of an object. In some embodiments, the diagrams of FIGS. 7A, 7B, and 7C are generated related to a measurement made using an FPI using a computer system (e.g., computer system 116 of FIG. 1). In the example shown in FIG. 7A, a sensor response as measured in a red sensor of a detector for a specific point is shown. In some embodiments, similar measurements are also available from the other two sensors for that same specific point. In the example shown in FIG. 7B, the image in FIG. 7B is calculated to reconstruct the original spectral character of the point in the image corresponding to the measurements. The specific pixel indicated with the arrow is calculated using the reconstruction matrix. In the example shown in FIG. 7C, spectral measures $x_{ij}$ are calculated by multiplying FPI measures $p_{in}$ for the different settable gaps with the inverse of the reconstruction calibration matrix $P_{nb}$.

In some embodiments, FIG. 7C illustrates a calculation that for a given image and mirror gap setting, the response for individual band-passes can be determined from the full calibration for a field material reference target. In some embodiments, the field material reference target includes all the color bands in the instrument's response range. In some embodiments, the field material reference target covers the full color gamut. In some embodiments, the field material reference target comprises an X-Rite color card. In some embodiments, the field material reference target includes areas with known short-wave infrared response. This can be mathematically expressed as the product of a series of linear equations of the sensor's response with coefficients to be determined for each pixel in the image. This is represented in the matrix formula with the form: x P=p, where x is the coefficient vector, P is the sensor response matrix and p the output intensity matrix. Solving for the coefficient vector, $x = p\ P^{-1}$, it becomes possible to apply captured images expressed as response matrix for a desired subset of gap settings and peak combinations to derive hyperspectral data-cubes.

However, the above example typically requires the time-consuming capture of hundreds of gap settings. It is also inflexible to modification in the field to address a specific application requirement (e.g., where lower spectral resolution and fewer band-passes are appropriate, the gap spacings must be configured in advance as it is tied to the calibration).

For most specific applications where the objective is to identify a known material or its condition, only a subset of those bands, typically ten (10) or less, are required to differentiate that spectral signature from the background items.

While it is possible to calibrate the instrument for such a specific set of band-passes, or even several different sets per the above, this restricts the use of the instrument to applications where there is a priori knowledge of what those specific band-passes are and therefore is not practical in the field.

A field calibration of the instrument using common materials as references can be performed to enable collection of a subset of all band-passes relevant to the application by utilizing data collected using the full range calibration.

Figure 8A:
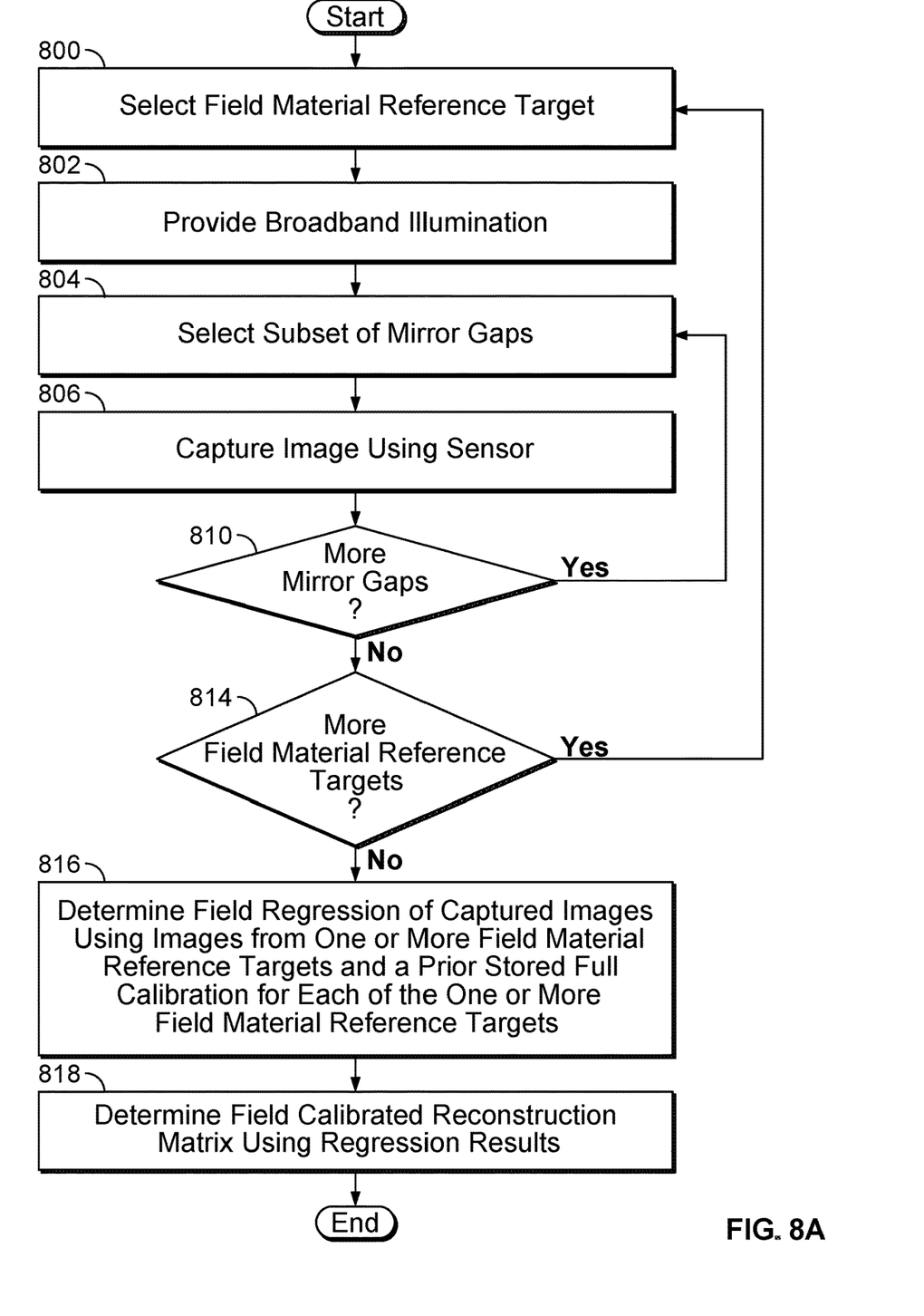
FIG. 8A is a flow diagram illustrating an embodiment of a process for performing a field calibration of an FPI.

FIG. 8A is a flow diagram illustrating an embodiment of a process for performing a field calibration of an FPI. In some embodiments, the process of FIG. 8A is executed on a computer system (e.g., computer system 116 of FIG. 1). In the example shown, in 800 a field material reference target is selected. For example, one or more known field material reference targets are selected for making a calibration of an FPI in the field. In some embodiments, the field material reference target includes all the color bands in the instrument's response range. In some embodiments, the field material reference target covers the full color gamut. In some embodiments, the field material reference target comprises an X-Rite color card. In some embodiments, the field material reference target includes areas with known short-wave infrared response. In 802, broadband illumination is provided. In 804, a subset of mirror gaps is selected. For example, a subset of mirror gaps comprises a number of gaps in the range of 100-1600 nm or 160, 170, and 180 relative spectral intensities in sensor counts. In some embodiments, FIG. 6A is a graph illustrating what a single gap transmission looks like. So, for example, 12 bands can be covered with three gaps each with slightly different band transmissions (e.g., three gaps in the range of 100-1600 nm or 160, 170, and 180 relative spectral intensities in sensor counts). In 806 an image is captured using a sensor. For example, for a known calibration target, a series of images is measured using an FPI with broadband illumination at a set of gaps. In 810, it is determined whether there are more mirror gaps. In response to determining that there are more mirror gaps, control passes to 804. In response to determining that there are not more mirror gaps, control passes to 814. In 814, it is determined whether there are more field material reference targets. In some embodiments, specific field material reference targets are not added or removed—only a single field material reference target in the field of view with coverage of the spectral range needed for the response to be modelled and solution to be derived with sufficient accuracy. In response to there being more field material reference targets, control passes to 800. In response to there not being more field material reference targets, control passes to 816. In 816, a field regression of captured images is determined using images from one or more field material reference targets and a prior stored full calibration for each of the one or more field material reference targets. In 818 a field calibrated reconstruction matrix is determined using regression results.

In some embodiments, the field calibrated reconstruction matrix is generated using results as derived from measurements of the one or more field material reference targets. In some embodiments, a complete field calibrated reconstruction matrix is constructed by using entries that are non-overlapping as derived from the measurements. In some embodiments, a complete field calibrated reconstruction matrix is constructed by using entries that are non-overlapping values (e.g., only one value for a reconstruction matrix element) as derived from the measurements. In some embodiments, a complete field calibrated reconstruction matrix is constructed using overlapping values (e.g., more than one value for a reconstruction matrix element) as derived from the measurements. In some embodiments, the overlapping values are averaged. In some embodiments, measurement values are normalized (e.g., over the single measurement results) prior to being averaged. In some embodiments, matrix values are normalized (e.g., over the entire matrix) prior to finalizing the reconstruction matrix.

In some embodiments, information is used from a single scene. One can think of it as calibration by use of simultaneous band references over the sensor instead of the conventional technique of sequentially introducing bands over the whole sensor. In some embodiments, the field calibrated reconstruction matrix is generated using one or more results as derived from measurements of a single field material reference target with multiple areas with different references in the view. In some embodiments, a complete field calibrated reconstruction matrix is constructed by using entries that are non-overlapping as derived from the measurements. In some embodiments, a complete field calibrated reconstruction matrix is constructed by using entries that are non-overlapping values (e.g., only one value for a reconstruction matrix element) as derived from the measurements. In some embodiments, a complete field calibrated reconstruction matrix is constructed using overlapping values (e.g., more than one value for a reconstruction matrix element) as derived from the measurements. In some embodiments, the overlapping values are averaged. In some embodiments, measurement values are normalized (e.g., over the single measurement results) prior to being averaged. In some embodiments, matrix values are normalized (e.g., over the entire matrix) prior to finalizing the reconstruction matrix.

Figure 8B:
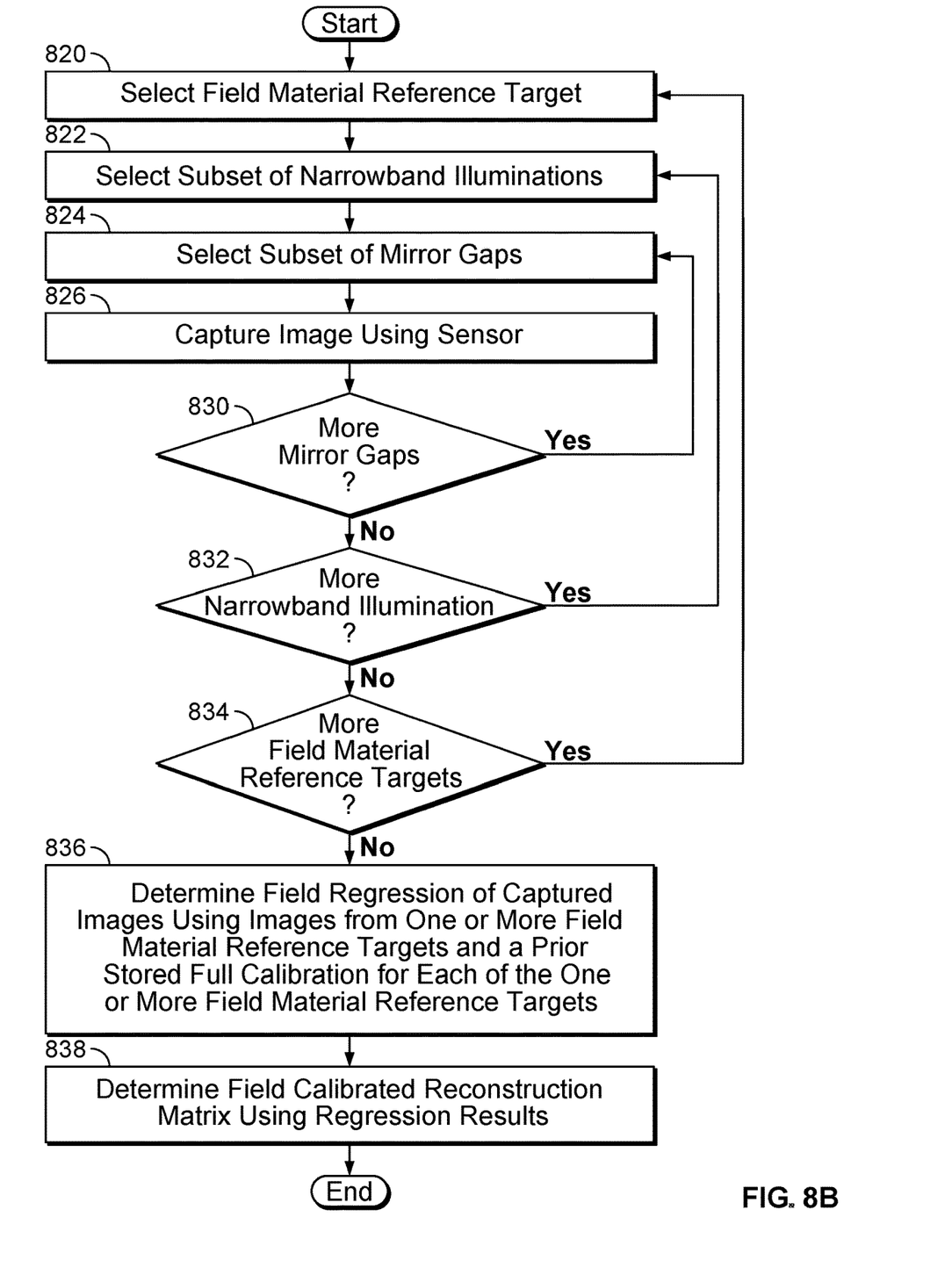
FIG. 8B is a flow diagram illustrating an embodiment of a process for performing a field calibration of an FPI.

FIG. 8B is a flow diagram illustrating an embodiment of a process for performing a field calibration of an FPI. In some embodiments, the process of FIG. 8B is executed on a computer system (e.g., computer system 116 of FIG. 1). In the example shown, in 820 a field material reference target is selected. For example, one or more known field material reference targets are selected for making a calibration of an FPI in the field. In some embodiments, the field material reference target includes all the color bands in the instrument's response range. In some embodiments, the field material reference target covers the full color gamut. In some embodiments, the field material reference target comprises an X-Rite color card. In some embodiments, the field material reference target includes areas with known shortwave infrared response. In 822, a subset of narrowband illuminations is selected. For example, a set of narrowband illuminations only in the bands of interest for a set of targets that are of interest—bands where the targets and non-targets differ, where a first target and a second target differ, etc. In 824, a subset of mirror gaps is selected. For example, a subset of mirror gaps comprises a number of gaps in the range of 100-1600 nm or 160, 170, and 180 relative spectral intensities in sensor counts. In some embodiments, FIG. 6A is a graph illustrating what a single gap transmission looks like. So, for example, 12 bands can be covered with three gaps each with slightly different band transmissions (e.g., three gaps in the range of 100-1600 nm or 160, 170, and 180 relative spectral intensities in sensor counts). In 826 an image is captured using a sensor. For example, for a known calibration target, a series of images is measured using an FPI with specific illumination at a set of gaps. In 830, it is determined whether there are more mirror gaps. In response to determining that there are more mirror gaps, control passes to 824. In response to determining that there are not more mirror gaps, control passes to 832. In 832, it is determined whether there are more narrow band illuminations. In response to there being more narrowband illuminations, control passes to 822. In response to there not being for narrowband illuminations, control passes to 834. In 834, it is determined whether there are more field material reference targets. In some embodiments, specific field material reference targets are not added or removed—only a single field material reference target in the field of view with coverage of the spectral range needed for the response to be modelled and solution to be derived with sufficient accuracy. In response to there being more field material reference targets, control passes to 820. In response to there not being more field material reference targets, control passes to 836. In 836, a field regression of captured images is determined using images from one or more field material reference targets and a prior stored full calibration for each of the one or more field material reference targets. In 838 a field calibrated reconstruction matrix is determined using regression results.

In some embodiments, the field calibrated reconstruction matrix is generated using results as derived from measurements of the one or more field material reference targets. In some embodiments, a complete field calibrated reconstruction matrix is constructed by using entries that are non-overlapping as derived from the measurements. In some embodiments, a complete field calibrated reconstruction matrix is constructed by using entries that are non-overlapping values (e.g., only one value for a reconstruction matrix element) as derived from the measurements. In some embodiments, a complete field calibrated reconstruction matrix is constructed using overlapping values (e.g., more than one value for a reconstruction matrix element) as derived from the measurements. In some embodiments, the overlapping values are averaged. In some embodiments, measurement values are normalized (e.g., over the single measurement results) prior to being averaged. In some embodiments, matrix values are normalized (e.g., over the entire matrix) prior to finalizing the reconstruction matrix.

In some embodiments, information is used from a single scene. One can think of it as calibration by use of simultaneous band references over the sensor instead of the conventional technique of sequentially introducing bands over the whole sensor. In some embodiments, the field calibrated reconstruction matrix is generated using one or more results as derived from measurements of a single field material reference target with multiple areas with different references in the view. In some embodiments, a complete field calibrated reconstruction matrix is constructed by using entries that are non-overlapping as derived from the measurements. In some embodiments, a complete field calibrated reconstruction matrix is constructed by using entries that are non-overlapping values (e.g., only one value for a reconstruction matrix element) as derived from the measurements. In some embodiments, a complete field calibrated reconstruction matrix is constructed using overlapping values (e.g., more than one value for a reconstruction matrix element) as derived from the measurements. In some embodiments, the overlapping values are averaged. In some embodiments, measurement values are normalized (e.g., over the single measurement results) prior to being averaged. In some embodiments, matrix values are normalized (e.g., over the entire matrix) prior to finalizing the reconstruction matrix.

Figure 9:
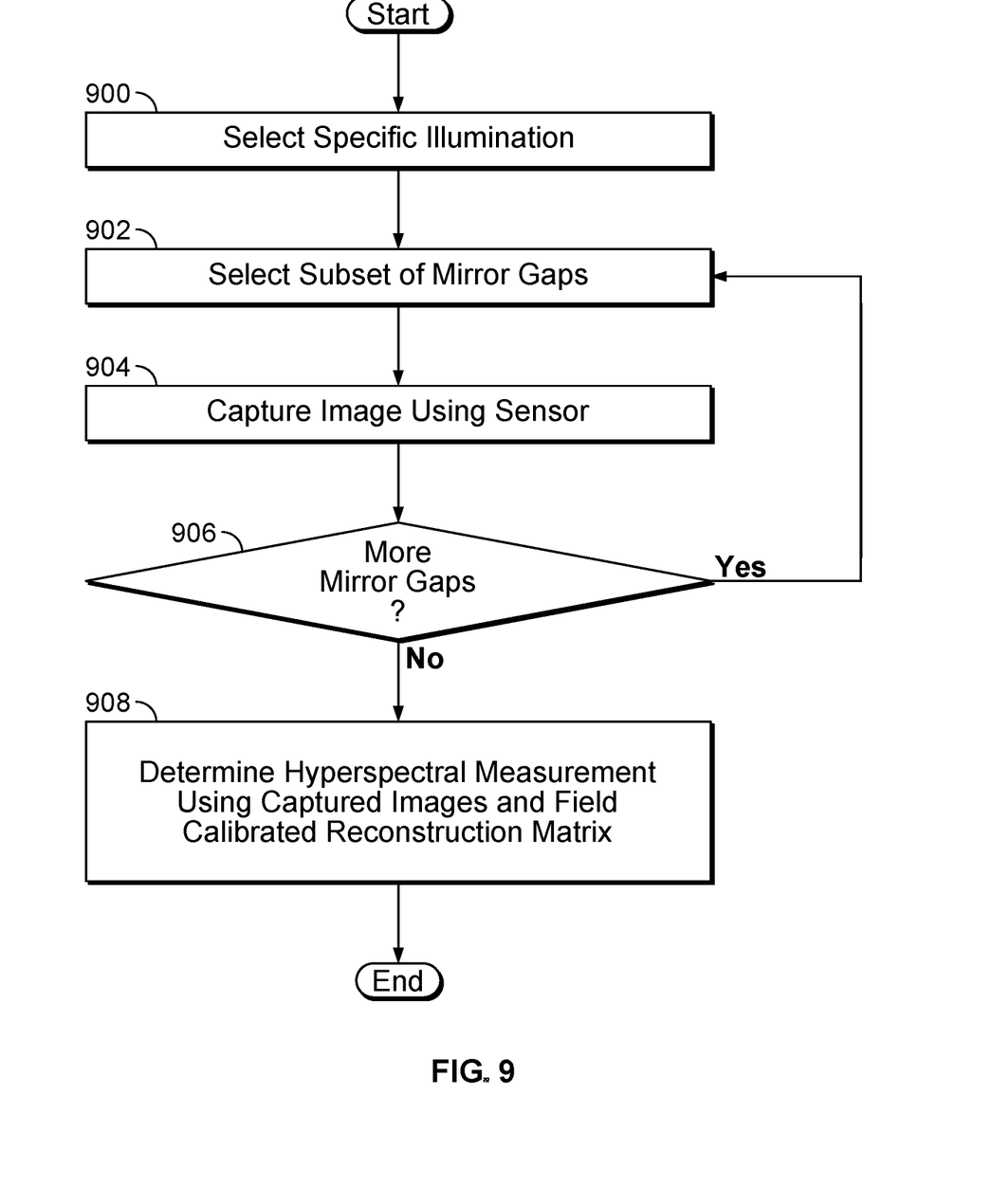
FIG. 9 is a flow diagram illustrating an embodiment of a process for making a measurement using a field calibrated reconstruction matrix.

FIG. 9 is a flow diagram illustrating an embodiment of a process for making a measurement using a field calibrated reconstruction matrix. In some embodiments, the process of FIG. 9 is implemented using a computer system (e.g., computer system 116 of FIG. 1). In the example shown, in 900, specific illumination is selected. For example, a broadband illumination, a narrowband illumination, or a set of narrowband illuminations is selected. In 902, a subset of mirror gaps is selected. For example, a group of mirror gaps is selected from all possible mirror gaps. In some embodiments, the selected group of mirror gaps is related to the selected subset of mirror gaps used for the field calibration. In some embodiments, the selected group of mirror gaps is the same as the selected subset of mirror gaps used for the field calibration. In 904, an image is captured using a sensor. In 906, it is determined whether there are more mirror gaps. In response to determining that there are more mirror gaps, control passes to 902. In response to determining that there are not more mirror gaps, control passes to 908. In 908, a hyperspectral measurement is determined using captured images and a field calibrated reconstruction matrix.

In some embodiments, the use of rapid field calibration and generation of the field calibrated reconstruction matrix enables near real-time hyperspectral measurements. For example, calibration is able to be performed at $1/1000^{th}$, $1/100^{th}$, $1/10^{th}$, $1/5^{th}$, $1/4^{th}$, or $1/3^{rd}$ of a full calibration time (e.g., using a set of known targets instead of a full set of narrowband illuminations and a full set of gaps). For example, measurement is able to be performed at $1/1000^{th}$, $1/100^{th}$, $1/10^{th}$, $1/5^{th}$, $1/4^{th}$, or $1/3^{rd}$ of a regular measurement time (e.g., using a full set of gaps instead of a subset of gaps).

In some embodiments, the advantage of the disclosed system over prior typical systems is in the speed of making a measurement—similar to the difference between a still photo and a video. The disclosed system enables (near) real time capture and classification. In prior typical systems, a "static" data-cube image is acquired, which requires 5-10 seconds for 300 bands (depending upon lighting conditions). With the disclosed system approach, a limited number of bands—for example, 10 bands—are taken at a hypercube frame rate of 10 hypercubes per second, which can also be rendered with classification.

Figure 10A:
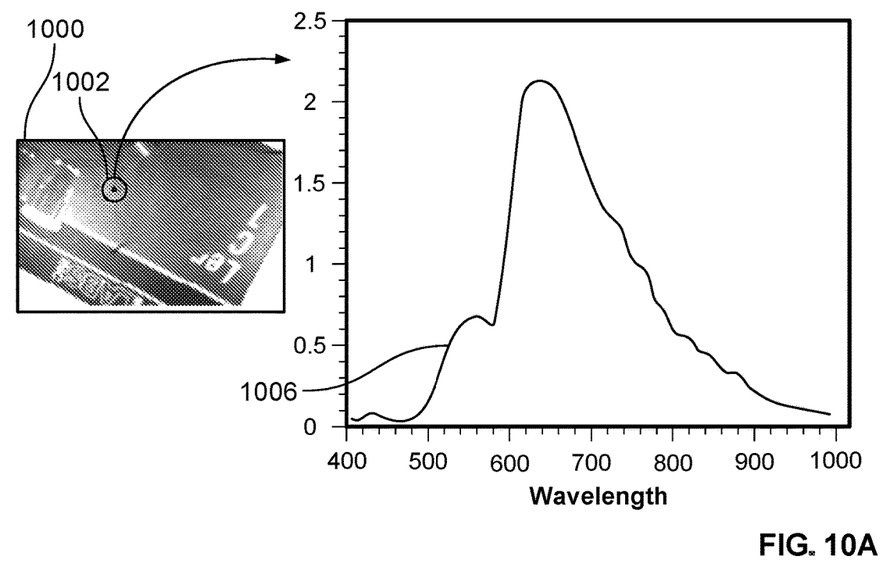
FIGS. 10A and 10B are diagrams illustrating a spectral measurement of a point in an image.
Figure 10B:
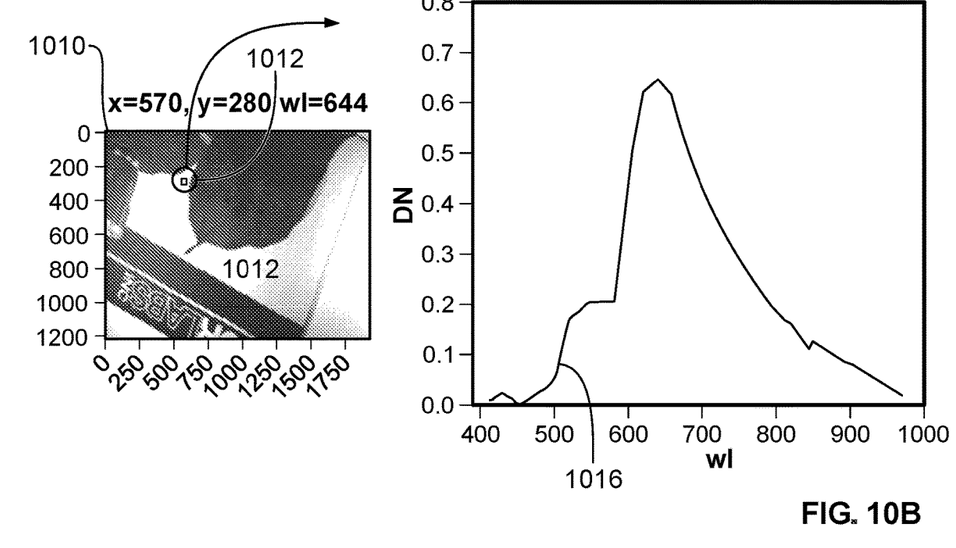

FIGS. 10A and 10B are diagrams illustrating a spectral measurement of a point in an image. In some embodiments, the diagrams in FIGS. 10A and 10B are generated using a computer system (e.g., computer system 116). In the example shown in FIG. 10A, image 1000 includes point 1002 with corresponding spectra 1006 at point 1002 that is determined using a full calibration. In the example shown in FIG. 10B, image 1010 includes point 1012 with corresponding spectra 1016 at point 1012 that is determined using a field calibration, wherein the field calibration disclosed herein takes a few minutes, and the prior typical system full calibration in the lab would take several hours. In some embodiments, the disclosed system is able to provide "live" spectral images with classification (e.g., images are taken at 10 frames per second to determine a classification of items in the images—for example, a threat, a substance of interest, a feature of interest, and a normal object.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a tunable Fabry-Perot etalon, wherein the tunable Fabry-Perot etalon has a settable gap;
   a detector, wherein the detector measures light intensity transmitted through the tunable Fabry-Perot etalon; and
   a processor configured to determine a calibrated spectral measurement, wherein the calibrated spectral measurement is based at least in part on a measurement set of detected light intensities for a selected set of settable gaps and a reconstruction matrix, wherein the reconstruction matrix is based at least in part on calibration measurements using one or more field material targets illuminated, prior stored full calibrations for each of the one or more field material targets, and the selected set of settable gaps.

2. The system as in claim 1, wherein a calibration measurement of the calibration measurements comprises selecting a field material target.

3. The system as in claim 1, wherein a calibration measurement of the calibration measurements comprises selecting a subset of narrowband illuminations.

4. The system as in claim 1, wherein a calibration measurement of the calibration measurements comprises selecting a subset of mirror gaps.

5. The system as in claim 1, wherein the calibrated spectral measurement comprises selecting specific illumination.

6. The system as in claim 1, wherein the calibrated spectral measurement comprises selecting a subset of settable gaps.

7. The system as in claim 1, wherein the calibrated spectral measurement comprises capturing an image using the detector.

8. The system as in claim 1, wherein the reconstruction matrix is determined using calibration measurements of a specific field material target made with the limited set of source wavelengths to scale a prior stored full calibration for the specific field material target.

9. The system as in claim 1, wherein the reconstruction matrix is determined using a composite of reconstructed matrices determined using each of the one or more field material targets.

10. The system of claim 1, wherein the detector comprises a monochrome detector.

11. The system of claim 1, wherein the detector comprises an RGB detector.

12. The system of claim 1, wherein the detector comprises an RGB detector and IR detector.

13. The system of claim 1, wherein the detector comprises a multiple band detector.

14. The system of claim 1, wherein the selected set of settable gaps includes settable gaps that number less than a predetermined number of settable gaps.

15. The system of claim 1, wherein the limited set of source wavelengths includes wavelengths that number less than a predetermined number of source wavelengths.

16. The system of claim 1, wherein the one or more field material targets include field material targets that number less than a predetermined number of field material targets.

17. A method, comprising:
   providing a tunable Fabry-Perot etalon, wherein the tunable Fabry-Perot etalon has a settable gap;
   providing a detector, wherein the detector measures light intensity transmitted through the tunable Fabry-Perot etalon; and
   determining, using a processor, a calibrated spectral measurement based at least in part on a measurement set of detected light intensities for a selected set of settable gaps and a reconstruction matrix, wherein the reconstruction matrix is based at least in part on calibration measurements using one or more field material targets, prior stored full calibrations for each of the one or more field material targets, and the selected set of settable gaps.

18. A computer program product, the computer program product being embodied in a non-transitory computer readable storage medium and comprising computer instructions for:

receiving a light intensity transmitted through a tunable Fabry-Perot etalon measured by a detector, wherein the tunable Fabry-Perot etalon has a settable gap; and determining a calibrated spectral measurement based at least in part on a measurement set of detected light intensities for a selected set of settable gaps and a reconstruction matrix, wherein the reconstruction matrix is based at least in part on calibration measurements using one or more field material targets, prior stored full calibrations for each of the one or more field material targets, and the selected set of settable gaps.

* * * * *